3,161,564
VETERINARY COMPOSITION CONTAINING
HALO-NITRO-BENZAMIDES AND METHODS
OF USING SAME
Neal F. Morehouse, Charles City, Iowa, assignor to Dr.
Salsbury's Laboratories, a corporation of Iowa
No Drawing. Filed Oct. 3, 1960, Ser. No. 59,843
11 Claims. (Cl. 167—53)

This invention relates to animal husbandry and more particularly to prophylactic and curative remedies for and methods of treatment and control of infectious diseases in fowl and domesticated animals.

Many animals, especially chickens and turkeys, are susceptible to various types of highly contagious infections which are the source of severe economic losses in terms of morbidity, lack of productivity and mortality.

One group of communicable and partly congenital poultry maladies is of bacterial origin and comprises pullorum disease, fowl typhoid and paratyphoid. Their causative agents are salmonellae which belong to the colon typhoid dysentery type of bacteria. The organisms live in the body of warm-blooded animals and frequently contaminate the food and water consumed by their hosts.

Another widely prevalent infection is avian coccidiosis. Its pathogenic factor is the protozoon, a type of unicellular organism which reproduces asexually by schizogenesis. The most damaging species among these parasites are *Eimeria tenella, Eimeria necatrix, Eimeria acervulina, Eimeria brunetti* and *Eimeria maxima*. They multiply in the digestive tract of the animals, particularly affecting the linings of the intestines and therein produce a severe inflammation of the tissues. Depending upon the degree of the infection the birds may develop a variety of symptoms ranging from simple bowel disorders to emaciation and death resulting from hemorrhage and anemia. Birds that have succumbed to coccidiosis show typical lesions upon autopsy. Economic losses due to coccidiosis are estimated at ten million dollars per year which compels the poultry industry to continue its intensive and relentless search for new, effective and inexpensive remedies to prevent and control this epizootic.

It is therefore one object of the present invention to provide new and improved chemotherapeutic agents and formulations thereof for the prophylaxis and control of protozoan and bacterial infections. Another object of the invention is to provide a new series of effective drugs to improve the feed utilization of the animals. Still a further object of the invention is to devise a new method for the prevention and abatement of coccidiogenic disorders and for the stimulation of growth and productivity in animals. Yet another object of the invention is to provide for chemotherapeutically useful concentrates which can be easily adapted and compounded by the feed miller and poultry raiser to form complete and medicated animal rations for the aforesaid purposes. Further objects of the invention will appear from the following specification and appended claims.

I have discovered that the aforementioned objects can be effectively achieved by the use of a series of compounds which may be generally defined as nucleus-halogenated nitrobenzamides as illustrated by the following configuration

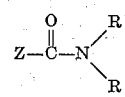

wherein R is either hydrogen or a lower alkyl, and wherein Z is a member selected from the group consisting of

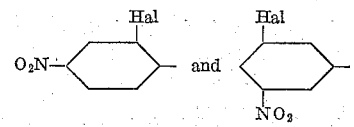

in which Hal represents chlorine, bromine or iodine.

R standing for lower alkyl may be selected from the group of methyl-, ethyl-, propyl-, butyl-, and their isomeric configurations. In any given compound comprised with the general scope of the configurations above set forth both R's may be either identical or of different structure. The alkyl groups in turn may be substituted by hydroxy-, alkoxy-, and halogens and the term "alkyl" as used in the appended claims is intended to include such substituted radicals. Typical representatives of compounds within the scope of the present invention are:

2-chloro-4-nitro-benzamide
2-chloro-N-methyl-4-nitro-benzamide
2-bromo-4-nitro-benzamide
2-bromo-N-methyl-4-nitrobenzamide
2-iodo-4-nitro-benzamide
2-iodo-N-methyl-4-nitro-benzamide
3-chloro-5-nitro-benzamide
3-chloro-N-methyl-5-nitro-benzamide The aforesaid compounds can be prepared by chlorination of a selected halogenated nitro-benzoic acid with thionyl-chloride and subsequent treatment of the resulting benzoylchloride with ammonia to convert it into the benzamide. An illustration of such a synthesis is given in the following example:

EXAMPLE 1

*2-Chloro-4-Nitro-Benzamide*

500 grams=2.48 moles of 2-chloro-4-nitrobenzoic acid (M.P. 139–149° C.) were refluxed in 915 grams or 1500 ml. (=7.7 moles) of thionyl-chloride for 2½ hours. Thereafter about 1100 ml. of thionyl-chloride was removed by distillation. The acylchloride was permitted to cool and then transferred into a separatory funnel from which it was slowly added by drops into a stirred solution of 3500 ml. of concentrated ammonia. The mixture was thereupon warmed for 45 minutes and finally chilled for several hours. The cream-colored 2-chloro-4-nitro-benzamide was collected on a filter, thoroughly washed with cold water and dried at 95° C. The yield was 405 grams=81.5%. The crude compound had a melting point between 165 and 170° C. and was purified to a white crystalline powder with a melting point of 171 to 172° C. It is almost colorless, only slightly soluble in cold water, easily soluble in warm ethanol and practically insoluble in ether.

In accordance with my invention the above-defined chemotherapeutic agents, which are not repulsive to the animals and at their effective dosage levels do not adversely affect their physiological functions, are advantageously employed by introducing the same into the animal organism in any form or manner in which they are apt to build up and maintain an effective blood or tissue level. This can be accomplished either by injection or by dispensation of suitable dosage units in capsules or tablets. As a preferred embodiment, however, the compounds are administered to the animals in combination with a solid, inert, and non-toxic vehicle in which they are uniformly and homogeneously dispersed. Inactive carriers of ingestible nature are any kind of vegetable food material such as ground corn, corn meal, dried distiller's grain, citrus meal, ordinary grain, mash, scratch and any other normal or commercial rations. The so medicated feed rations are placed before the birds for consumption ad libitum. The compounds may also be used as active ingredients in liquid compositions which can be conveniently prepared by means of drinking water in which they are dissolved or suspended with the help of skim milk, edible oils, syrups, wetting agents and emulsifiers.

The new drugs are principally, but not exclusively, intended for prophylactic purposes to prevent the eruption and spread of a latent infection and as such are to be fed on a continuous schedule. When, for instance, an impending outbreak of coccidiosis in a mature flock is suspected by reason of exposure or the sporadic appearance of the first clinical symptoms of the disease, the remedies are administered to the birds for approximately two weeks, but treatment may be extended for a longer period if the infection is of more serious nature. Moreover, animals placed on a diet medicated with my novel drugs will convert their feed into body meat at a higher and more effective rate than when held to unmedicated rations; as a result of such accelerated growth the marketability of the treated animals is advanced.

The minimum effective daily dosages of the compounds for growth stimulating purposes have been found at 10 to 30 mg. per kg. body weight depending upon the age and weight of the animal. For prophylactic control of coccidiosis the minimum dosage level has been established at approximately 30 mg. per kg. body weight per day. These dosages may be increased up to aproximately 600 mg. per kg. body weight depending upon the animal and the severity of the coccidial infection involved, and will be made to vary in accordance with the normal feed consumption and the feed habits of the animals so as to provide the required effective intake of the drug. The treatment is conveniently carried out by administering to the animals a medicated feed ration containing the active ingredients in effective non-toxic concentrations which may slightly fluctuate in conformity with the specific compound selected for medication and the particular coccidiogenic organism involved. Thus, for instance, 2-chloro-4-nitro-benzamide and its N-substituted alkyl derivatives require a minimum dosage level of about 0.01% in the case of E. tenella infections, but more nearly 0.15% for the control of E. acervulina and 0.1% for the control of E. brunetti. The corresponding 2-iodo- and 2-bromo-4-nitro-benzamides show efficacy at a minimum concentration of approximately 0.025% for combating E. necatrix. The 3-chloro-5-nitro-benzamides call for a minimum of 0.0125% and a tolerable maximum of 0.1%, whereas again the 2-halo-4-nitro-benzamides permit a dosage increase up to nearly 0.4% which may be indicated for curative purposes especially in cases where an infection has taken hold and spread over a considerable area of a poultry colony. The chemotherapeutic activity of my novel drugs lies accordingly within an over-all range of approximately 0.01% and 0.4%.

The utility of my new remedies will be illustrated by a number of tests against the aforesaid pathogenic parasites of avian coccidiosis. The activity of the drugs has been evaluated and expressed in terms of comparative mortality rates, fecal scores and morbidity factors.

For each test perfectly healthy New Hampshire or Leghorn chicks in groups of four were reared in electrically heated brooding batteries and particular care was taken to protect the birds against extraneous exposure to coccidia and other infective organisms. When the birds were about one to six weeks old, they were placed in individual cages which had been thoroughly cleaned and disinfected. Feed and water cups were sterilized with boiling water. The birds were observed for one to two days for possible sickness; afflicted specimens were replaced by healthy substitutes. During the observation period the chicks became adjusted to their new environment and acquired test-fitness. Each chick was weighed starting on the day of the experiment. The birds were then moved from one cage to another so as to ensure approximate equality of the mean weights of each test group.

For artificial infection a single dose of 100,000 sporulated oocysts of E. tenella, E. necatrix or E. brunetti were given to each chick, while E. acervulina was introduced by the inoculation of 5,000,000 oocysts into each bird on two consecutive days. Medication was started three or four days prior to experimental inoculation and continued for about eight to thirteen days thereafter at the end of which period the chemotherapeutic value of the compound was assessed with finality, although a definite trend of action could be observed at an earlier stage, for instance between the fifth and seventh day following the infection.

Beginning on the fourth day after experimental inoculation and every day thereafter until the conclusion of the experiment the droppings of each bird were carefully examined and their deviations from the normal appearance were graded in accordance with accepted practice as "fecal scores" which were computed in the following manner. In the case of E. tenella the amount of hemorrhage in the droppings collected in metal pans beneath the birds were rated and recorded in terms of 0—no hemorrhage
B—slight hemorrhage
BB—moderate hemorrhage
BBB—severe hemorrhage
BBBB—very severe hemorrhage Upon the conclusion of the test the maximum hemorrhage rating for each bird, irrespective of the day of its occurrence, was recorded. All the maximum ratings for the medicated infected groups were totaled and compared with the total of the maximum ratings of the non-medicated infected controls. If the artificial infections had taken effective hold, each of the four infected and non-medicated birds would show a full rating of BBBB during at least one day of the test period so that the maximum total rating for that group would usually amount to 16 B's. Supposing the highest ratings for four infected and medicated birds in a given group are respectively 0, BB, B and B, the total rating for the entire group would be 4 B's. The difference between the B-totals divided by the maximum rating established for the infected non-medicated controls × 100 represents the "fecal score," thus 16−4=12; 12/16×100=75%. A fecal score of 75%, therefore, means that the droppings were 75% normal.

The fecal scores for other species which cause no hemorrhage in the feces are similarly computed on the basis of normalcy evaluations of the droppings to be rated as follows:

0—droppings normal
+—droppings slightly abnormal
++—droppings about half normal
+++—droppings about ¼ normal
++++—droppings completely abnormal The morbidity factor expresses the comparative values between weight gains of medicated, infected birds on the one hand, and non-medicated, non-infected controls on the other. During the interval between the 5th and 7th day, the coccidial infection ordinarily causes the maximum inhibition of growth which reflects itself in the ultimate weight gains (or losses) at the conclusion of the test period. Assuming the mean weight increase of the infected, medicated group is 180 gm. and that of the non-infected, non-medicated birds is 200 gm. the ratio of $$\frac{180}{200} \times 100 = 90\%$$

would present the morbidity factor and indicate that due to the beneficial action of the drug the subnormal growth rate produced by the infection fell by only 10%. If the morbidity factor of the infected, non-medicated control birds is only 50%, the comparison would show that the medication has checked the stunting effect of the disease to an extent of 40%.

In Table I the column indicating the Test No. is followed by the name of the compound under investigation and the specific coccidiogenic organism which was tested. Under the heading "Schedule" the first figure in the symbol designates the number of feed-medication days prior to the infection, the second signifies the total number of medication days. Thus, e.g., 4–IF (12) means that the birds were placed on the medicated diet 4 days before artificial inoculation and that medication was given for a total of 12 days or for 8 additional days subsequent to infection.

The next column lists the dosage levels in terms of concentrations in the feed. The mortality rates, fecal scores and morbidity factors are recorded in the last three columns. Each of the experiments includes a control test wherein infected groups of 4 birds were deprived of the medication. In some of the tests the morbidity factor eluded assessment because all of the birds had succumbed to coccidiosis either in the untreated, infected control group or in tests below the effective dosage levels; these occurrences have been marked with 4 asterisks, ****.

TABLE I

| Test No. | Compound | Parasite | Schedule | Feed Conc., percent | Mortality | Fecal Score | Morbidity Factor |
|---|---|---|---|---|---|---|---|
| 1 | 2-chloro-4-nitrobenzamide | E. tenella | 4–IF–(12) | 0.0125 | 0 | 40 | 89.2 |
|  |  |  |  | 0.0250 | 0 | 95 | 98.2 |
|  |  |  |  | 0.0500 | 0 | 100 | 93.7 |
|  |  | Control |  | 0 | 25 | 0 | 49.8 |
| 2 | do | E. tenella | 3–IF (11) | 0.0100 | 25 | 15 | 58.4 |
|  |  |  |  | 0.0150 | 0 | 65 | 83.4 |
|  |  |  |  | 0.0200 | 0 | 90 | 98.1 |
|  |  |  |  | 0.0250 | 0 | 80 | 98.1 |
|  |  |  |  | 0.0500 | 0 | 100 | 89.4 |
|  |  |  |  | 0.1000 | 0 | 100 | 76.2 |
|  |  |  |  | 0.2000 | 0 | 100 | 40.8 |
|  |  | Control |  | 0 | 50 | 0 | 43.6 |
| 3 | do | E. necatrix | 3–IF (16) | 0.0025 | 100 | 0 | **** |
|  |  |  |  | 0.0050 | 100 | 0 | **** |
|  |  |  |  | 0.0100 | 100 | 0 | **** |
|  |  |  |  | 0.0150 | 25 | 30 | 28.5 |
|  |  |  |  | 0.0200 | 25 | 40 | 54.9 |
|  |  |  |  | 0.0250 | 0 | 100 | 103.1 |
|  |  |  |  | 0.0500 | 0 | 100 | 87.7 |
|  |  |  |  | .1000 | 0 | 100 | 80.4 |
|  |  |  |  | 0.2000 | 0 | 100 | 49.0 |
|  |  |  |  | 0.4000 | 0 | 100 | 0.5 |
|  |  | Control |  | 0 | 100 | 0 | **** |
| 4 | do | E. necatrix | 3–IF (14) | 0.0250 | 0 | 65 | 46.8 |
|  |  |  |  | 0.0500 | 0 | 100 | 81.9 |
|  |  |  |  | 0.1000 | 0 | 100 | 89.1 |
|  |  | Control |  | 0 | 75 | 25 | 0.2 |
| 5 | do | E. necatrix | 3–IF (14) | 0.250 | 0 | 95 | 107.7 |
|  |  | Control |  | 0 | 35 | 0 | 17.8 |

TABLE II

| Test No. | Compound | Parasite | Schedule | Feed Conc., percent | Mortality | Fecal Score | Morbidity Factor |
|---|---|---|---|---|---|---|---|
| 6 | 2-chloro-4-nitrobenzamide | E. necatrix | 3–IF (14) | 0.0250 | 0 | 95 | 75.2 |
|  |  |  |  | 0.0500 | 0 | 100 | 91.8 |
|  |  |  |  | 0.1000 | 0 | 100 | 79.6 |
|  |  | Control |  | 0 | 75 | 0 | 4.0 |
| 7 | do | E. necatrix | 3–IF (14) | 0.0250 | 0 | 90 | 94.0 |
|  |  |  |  | 0.0250 | 0 | 100 | 96.7 |
|  |  |  |  | 0.0500 | 0 | 100 | 88.8 |
|  |  |  |  | 0.0750 | 0 | 100 | 79.8 |
|  |  | Control |  | 0 | 100 | 0 | *** |
| 8 | do | E. acervulina | 3–IF (14) | 0.0250 | 0 | 0 | 13.0 |
|  |  |  |  | 0.0500 | 0 | 0 | 40.2 |
|  |  |  |  | 0.1000 | 0 | 5 | 15.2 |
|  |  |  |  | 0.1500 | 0 | 55 | 29.0 |
|  |  | Control |  | 0 | 25 | 0 | 28.2 |
| 9 | do | E. acervulina | 3–IF (14) | 0.1500 | 0 | 40 | 20.0 |
|  |  |  |  | 0.2000 | 0 | 70 | 28.2 |
|  |  | Control |  | 0 | 0 | 0 |  |
| 10 | do | E. brunetti | 3–IF (14) | 0.0250 | 0 | 0 | 8. |
|  |  |  |  | 0.0500 | 0 | 55 | 71. |
|  |  |  |  | 0.1000 | 0 | 100 | 84. |
|  |  |  |  | 0.1500 | 0 | 100 | 60. |
|  |  | Control |  | 0 | 25 | 0 | 14. |
| 11 | 2-chloro-N-methyl-4-NBA | E. necatrix | 3–IF (13) | 0.0125 | 25 | 5 | 16. |
|  |  |  |  | 0.0250 | 25 | 40 | 70. |
|  |  |  |  | 0.0500 | 0 | 75 | 69. |
|  |  | Control |  | 0 | 50 | 10 | 11. |

TABLE III

| Test No. | Compound | Parasite | Schedule | Feed Conc., percent | Mortality | Fecal Score | Morbidity Factor |
|---|---|---|---|---|---|---|---|
| 12 | 2-bromo-4-nitrobenzamide | E. necatrix | 3-IF (14) | 0.0250 | 0 | 65 | 84.8 |
|  |  |  |  | 0.0500 | 0 | 95 | 67.5 |
|  |  |  |  | 0.1000 | 0 | 100 | 80.2 |
|  |  | Control |  | 0 | 100 | 0 | -------- |
| 13 | 2-iodo-4-nitrobenzamide | E. necatrix | 3-IF (14) | 0.0250 | 25 | 40 | 63.5 |
|  |  |  |  | 0.0500 | 0 | 75 | 110.7 |
|  |  |  |  | 0.1000 | 0 | 100 | 104.7 |
|  |  | Control |  | 0 | 25 | 0 | < 0 |
| 14 | 3-chloro-5-nitrobenzamide | E. necatrix | 3-IF (14) | 0.0125 | 0 | 55 | 66.7 |
|  |  |  |  | 0.0250 | 0 | 75 | 92.6 |
|  |  | Control |  | 0 | 50 | 0 | < 0 |
| 15 | ....do.... | E. necatrix | 3-IF (14) | 0.0250 | 0 | 95 | 101.8 |
|  |  |  |  | 0.0500 | 0 | 100 | 58.6 |
|  |  | Control |  | 0 | 25 | 0 | 17.8 |

As can be seen from the foregoing tables, the above described halogenated nitrobenzamides are potent and innocuous drugs in the control of a variety of coccidiosis infections if dispensed at tolerated dosage levels. In Experiment 1, for instance, mortality is 0 in all concentrations while 25% of the control birds died of the disease. With rising concentrations from 0.0125% to 0.05% the fecal scores increased from 40 to 100% normality and the morbidity factor improved up to 93.7% as against 49.8% for the infected, non-medicated birds.. The results in Experiment 3 are even more impressive in that the fecal scores were 100% normal at dosage levels starting at 0.025% and the morbidity factor at that concentration exceeded that of the non-infected and non-medicated birds by 3.1%. All the infected, non-medicated control birds died of coccidiosis in that test. The corresponding bromo- and iodo-nitrobenzamides and the 3-chloro-5-nitrobenzamide performed in a similar manner. 2-chloro-N-methyl-4-nitrobenzamide displayed activity at all dosage levels, showing at a concentration of 0.05% a mortality rate of 0, a fecal score of 75% normality and an increase in the morbidity factor or normal growth rate of almost 70% despite the strain of the infection.

The preparation of the medicated feed compositions was carried out by intimately mixing the active ingredient with an orally ingestible carrier material, such as feed, in the amount of about 20% to 50% by weight and introducing a proportionate quantity of this premix into the bulk of a commercial feed ration with thorough stirring and shuffling until a uniform blend of even distribution at the desired concentration level between approximately 0.01% and 0.4% was obtained. Commercial feed rations of the type employed in my experiments included the normal constituents in a mash or scratch supplemented with desirable amounts of vitamins, trace minerals, antibiotics, growth stimulants and preservatives.

To facilitate the handling of the small amounts of chemicals to be incorporated into the ultimate medicated ration the premix can also be prepared by grinding a limited quantity of a non-toxic inert vehicle with an amount of about 20 to 50% by weight of the drug. In this case the carrier material may consist of fuller's earth, talcum, bentonite, ground oyster shells, limestone and divers clays, or edible feed substances such as soybean meal, wheat middlings and corn meal, and such stock concentrates are specifically made and adapted for use in dilutions with an edible carrier so as to compound the medicated rations at the desired dosage levels with utmost convenience. The availability of such concentrates is therefore highly desirable, if not indispensable, for the feed manufacturer and poultry raiser who ordinarily uses about one pound of the premix or concentrate for each ton of commercial feed to produce the finished medicated ration.

While the invention has been illustrated by the foregoing examples, it will be apparent that various equivalent changes and modifications may be resorted to in carrying out the invention without departing from the scope and spirit thereof. Thus, e.g., the halogenated nitrobenzamides may be dispensed concurrently with other coccidiostats, bacteriostats and/or synergistic agents within the limits of compatibility and tolerance which can be easily determined by any worker skilled in the art. All such modifications and equivalent embodiments of my inventive concept are intended to be included within the purview and scope of the appended claims.

What I claim is:

1. A veterinary composition comprising an orally ingestible non-toxic vehicle containing a small, but effective non-toxic amount of a compound having the formula

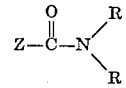

wherein R is a member of the group consisting of hydrogen and lower alkyl, and wherein Z is a member selected from the group consisting of

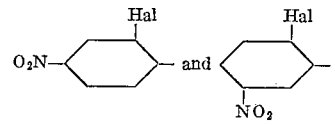

in which Hal is a halogen of the group consisting of chlorine, bromine and iodine, said compound being present in an approximate concentration range of 0.01% to 0.4% by weight of the composition.

2. An animal feed containing a compound having the formula

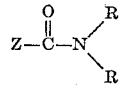

wherein R is a member of the group consisting of hydrogen and lower alkyl, and wherein Z is a member selected from the group consisting of

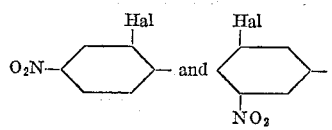

in which Hal is a halogen of the group consisting of chlorine, bromine and iodine, said compound being present within an approximate concentration range of 0.01% to 0.4% by weight of the feed composition.

3. An animal feed containing approximately 0.01% to 0.4% by weight of 2-chloro-4-nitro-benzamide.

4. An animal feed containing approximately 0.01% to 0.4% by weight of 2-chloro-N-methyl-4-nitro-benzamide.

5. An animal feed containing approximately 0.01% to 0.4% by weight of 2-bromo-4-nitro-benzamide.

6. An animal feed containing approximately 0.025% to 0.4% by weight of 2-iodo-4-nitro-benzamide.

7. An animal feed containing approximately 0.0125% to 0.1% by weight of 3-chloro-5-nitro-benzamide.

8. In the practice of animal husbandry the method which comprises administering to animals a compound having the formula

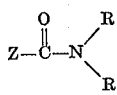

wherein R is a member of the group consisting of hydrogen and lower alkyl, and wherein Z is a member selected from the group consisting of

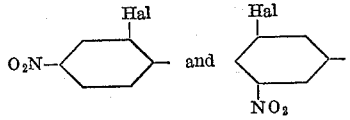

in which Hal is a halogen of the group consisting of chlorine, bromine and iodine, said compound being employed at a daily dosage level within the approximate range of 10 mg. to 600 mg. per kg. body weight of the animal.

9. A veterinary composition useful for the treatment of coccidiosis comprising an animal feed and a small, but effective non-toxic amount of 2-chloro-4-nitrobenzamide as the active ingredient.

10. An animal feed useful in the practice of animal husbandry comprising a nutrient material and having intimately and uniformly dispersed therein a compound having the following formula

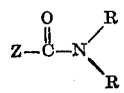

wherein R is a member of the group consisting of hydrogen and lower alkyl, and wherein Z is a member selected from the group consisting of

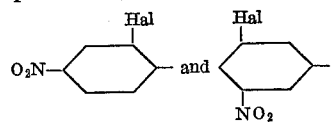

in which Hal is a halogen of the group consisting of chlorine, bromine, and iodine.

11. An animal feed useful in the practice of husbandry comprising a nutrient material having intimately and uniformly dispersed therein the compound 2-chloro-4-nitrobenzamide.

References Cited in the file of this patent
FOREIGN PATENTS
653,027     Great Britain _____ May 9, 1951

OTHER REFERENCES

Chem. Abst., vol. 43, 1949, p. 7455c.
Chem. Abst., vol. 48, 1954, p. 12785c.